(12) United States Patent
Watanabe et al.

(10) Patent No.: US 8,261,707 B2
(45) Date of Patent: Sep. 11, 2012

(54) VALVE TIMING CONTROLLER FOR INTERNAL COMBUSTION ENGINE

(75) Inventors: Shinji Watanabe, Chiyoda-ku (JP); Akira Furuta, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 492 days.

(21) Appl. No.: 12/683,003

(22) Filed: Jan. 6, 2010

(65) Prior Publication Data

US 2010/0242880 A1    Sep. 30, 2010

(30) Foreign Application Priority Data

Mar. 30, 2009 (JP) ................................. 2009-081250

(51) Int. Cl.
*F01L 1/34* (2006.01)
(52) U.S. Cl. ................. 123/90.17; 123/90.15; 123/90.31
(58) Field of Classification Search ............... 123/90.15, 123/90.17, 90.31
See application file for complete search history.

(56) References Cited

U.S. PATENT DOCUMENTS 6,032,623 A * 3/2000 Yamagishi et al. ........ 123/90.15

FOREIGN PATENT DOCUMENTS

| JP | 3337396 B2 | 1/1999 |
| JP | 2006-144637 A1 | 6/2006 |
| JP | 2008-157049 A1 | 7/2008 |
| JP | 2008-286125 A1 | 11/2008 |

OTHER PUBLICATIONS

Japanese Office Action corresponding to Japanese Patent Application No. 2009-081250, dated Feb. 22, 2011.

* cited by examiner

*Primary Examiner* — Zelalem Eshete
(74) *Attorney, Agent, or Firm* — Sughrue Mion, PLLC

(57) ABSTRACT

The valve timing controller for the internal combustion engine determines, based on a control parameter during phase angle feedback control, whether or not the valve timing variable mechanism is pressed against a limiting position defined by a stopper, sets a second target phase angle on a reference rotational phase angle value side of the camshaft by a first predetermined value from a detected real phase angle value of the camshaft when the stopper pressing determination means determines that the valve timing variable mechanism is pressed against the limiting position defined by the stopper, and switches a target phase angle during the phase angle feedback control from the first target phase angle to the second target phase angle.

12 Claims, 11 Drawing Sheets

VALVE TIMING CONTROLLER FOR INTERNAL COMBUSTION ENGINE

BACKGROUND OF THE INVENTION

1. Field of the Invention

The present invention relates to a valve timing controller for controlling operation timing of intake valves or exhaust valves of an internal combustion engine.

2. Description of the Related Art

A conventional valve timing controller for an internal combustion engine, which adjusts a phase angle of a camshaft with respect to a crankshaft of the internal combustion engine to adjust open and close timing of the intake valves or exhaust valves, includes a variable valve timing mechanism for adjusting a rotational phase of the camshaft to adjust the valve timing.

The variable valve timing mechanism regulates the duty value of the current passing through a linear solenoid valve for controlling oil pressure to adjust the rotational phase so that the valve timing can be quickly displaced to the most advanced angle side and power consumption required to hold the valve timing at the most advanced angle side can be reduced.

Further, a time period Y during which a 100% ON duty value is output is determined based on the deviation ΔTA of the target value TA of the rotational phase, which is in accordance with the operation conditions, the temperature of oil, and the power supply voltage, when the target value TA is switched to the most advanced angle side that is a stopper position, and the 100% ON duty value is output to the linear solenoid valve during the time period Y since the time when the target value TA is switched to the most advanced angle side. After the time period Y passes, a duty value X required to hold the valve timing at the most advanced angle side is determined in accordance with the power supply voltage at a given time, and the 100% ON duty value is reduced to the determined duty value X, to thereby hold the valve timing at the most advanced angle side (see, for example, Japanese Patent No. 3337396).

The conventional valve timing controller for the internal combustion engine is, however, configured to output the driving duty value provided to the linear solenoid for controlling the rotational phase of the camshaft at the maximum value (100%) when the target value TA of the rotational phase of the camshaft is switched to the most advanced angle position acting as the stopper position, and to then output the duty value X, with which the most advanced angle position is held, when a predetermined duration of time (Y) is passed after the target value TA is switched to the most advanced angle position. Consequently, the power consumption is increased since the overcurrent is provided to the linear solenoid in order to hold the rotational phase angle of the camshaft at the most advanced angle position.

Further, the conventional valve timing controller for the internal combustion engine is also configured to, when the target value TA of the rotational phase of the camshaft is switched to the most advanced angle position acting as the stopper position, output the driving duty value provided to the linear solenoid at the maximum value (100%) and the valve timing controller is struck to the stopper position at the maximum striking speed. Consequently, there is a problem that it may be difficult to ensure durability of the stopper of the variable valve timing mechanism when the rotational phase is frequently adjusted to the most advanced angle position acting as the stopper position.

SUMMARY OF THE INVENTION

The present invention has been made to solve the above-mentioned problems, and therefore it is an object of the present invention to provide a valve timing controller for an internal combustion engine, which stably holds the phase angle of the camshaft in a vicinity of a limiting phase angle value defined by the stopper with a required minimum power consumption while avoiding an overcurrent state of an actuator.

According to the present invention, a valve timing controller for an internal combustion engine, which drives with an actuator and changing a valve timing variable mechanism so that open and close timing of at least one of an intake valve and an exhaust valve is changed, the valve timing variable mechanism being capable of continuously changing a rotational phase angle of a camshaft with respect to a crankshaft of the internal combustion engine from a reference phase angle value at a time when phase angle control is stopped to a limiting phase angle value defined by a stopper, the valve timing controller for the internal combustion engine comprises: a crank angle sensor for detecting a reference rotational position of the crankshaft; a cam angle sensor for detecting a reference rotational position of the camshaft; real phase angle detecting means for detecting a real phase angle of the camshaft based on detection signals from the crank angle sensor and the cam angle sensor; driving condition detecting means for detecting a driving condition including a temperature parameter of the internal combustion engine; first target phase angle setting means for setting a first target phase angle of the camshaft based on the driving condition detected by the driving condition detecting means; phase angle feedback control means for performing feedback control so that the real phase angle is coincident with the first target phase angle and calculating an amount of operation for the actuator; stopper pressing determination means for determining, based on a control parameter during the phase angle feedback control, whether or not the valve timing variable mechanism is pressed against a limiting position defined by the stopper; second target phase angle setting means for setting a second target phase angle on a reference rotational phase angle value side of the camshaft by a first predetermined value from the detected real phase angle value of the camshaft when the stopper pressing determination means determines that the valve timing variable mechanism is pressed against the limiting position defined by the stopper; and target phase angle switching means for switching the target phase angle during the phase angle feedback control from the first target phase angle to the second target phase angle when the stopper pressing determination means determines that the valve timing variable mechanism is pressed against the limiting position defined by the stopper.

According to the valve timing controller for an internal combustion engine of the present invention, it is possible to stably hold the phase angle of the camshaft in the vicinity of the limiting phase angle value defined by the stopper with the required minimum power consumption while avoiding the overcurrent state of the actuator.

DETAILED DESCRIPTION OF THE PREFERRED EMBODIMENTS

Embodiment 1

Hereinafter, a valve timing controller for an internal combustion engine according to Embodiment 1 of the present invention is described with reference to the drawings.

Figure 1:
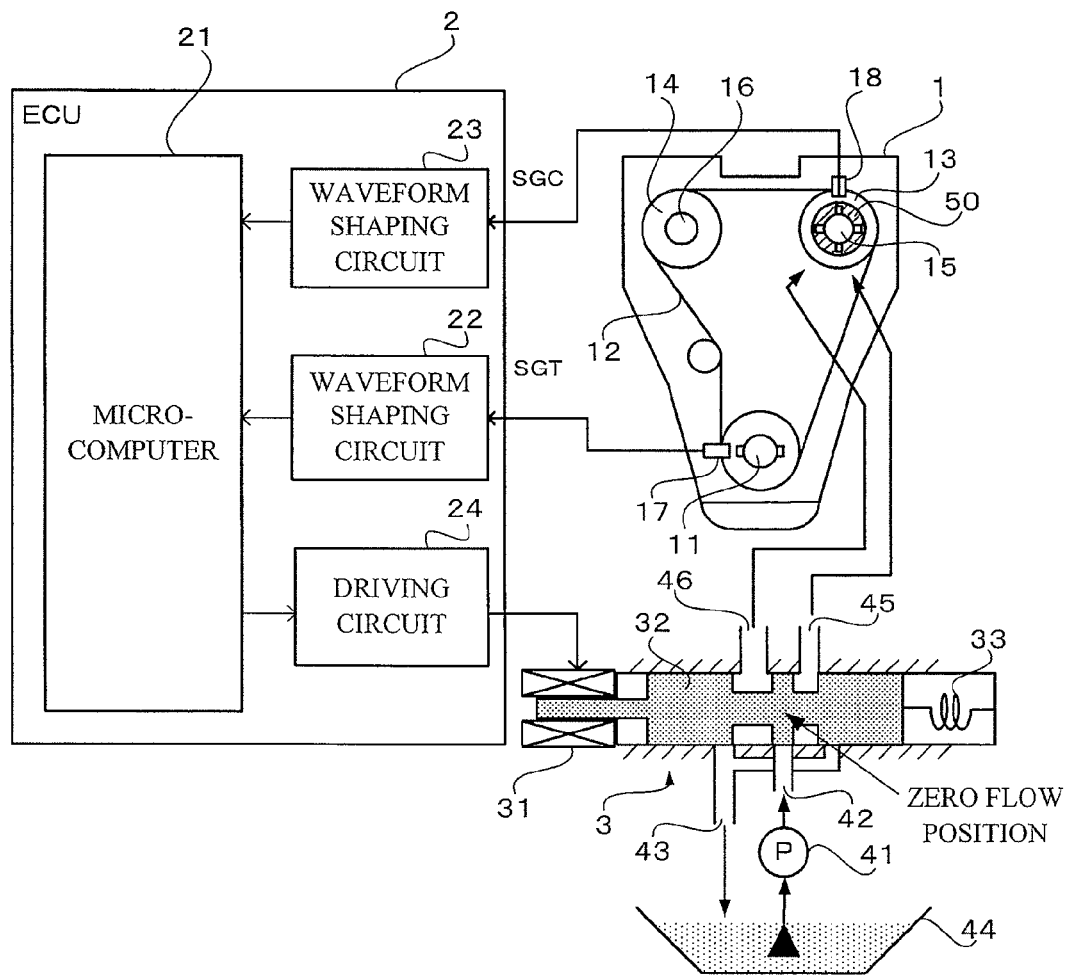
FIG. 1 is a schematic configuration diagram of a valve timing controller for an internal combustion engine according to Embodiment 1 of the present invention.

FIG. 1 is a schematic configuration diagram illustrating the valve timing controller for the internal combustion engine according to Embodiment 1 of the present invention.

In FIG. 1, reference numeral 1 denotes the internal combustion engine. Driving force is transmitted from a crankshaft 11 of the internal combustion engine 1 to a pair of timing pulleys 13, 14 via a timing belt 12. The pair of timing pulleys 13, 14, which are rotationally driven in synchronization with the crankshaft 11, include a pair of camshafts 15, 16 as driven shafts. Intake valves and exhaust valves (not shown) are driven to open and close by the camshafts 15, 16.

The intake valves and exhaust valves are driven to open and close in synchronization with the rotation of the crankshaft 11 and with the vertical motion of pistons (not shown). In other words, the intake valves and exhaust valves are driven at a predetermined open and close timing in synchronization with a series of four strokes including an intake stroke, a compression stroke, an explosion (expansion) stroke, and an exhaust stroke of the internal combustion engine 1.

The crankshaft 11 and the camshaft 15 include a crank angle sensor 17 and a cam angle sensor 18, respectively. A crank angle signal SGT and a cam angle signal SGC are output from the crank angle sensor 17 and the cam angle sensor 18, respectively, and input to an electronic control unit (ECU) 2.

The crank angle sensor 17 and the cam angle sensor 18 are set up such that 2N pulses are generated by the cam angle sensor 18 per one rotation of the camshaft 15, while N pulses are generated by the crank angle sensor 17 per one rotation of the crankshaft 11. Further, the number of pulses is determined such that $N \leq (360/VTmax)$, where VTmax indicates the maximum value of timing angle variation of the camshaft 15 in crank angle degree. This leads that the pulse signal of the crank angle sensor 17, i.e. the crank angle signal SGT, and the pulse signal of the cam angle sensor 18, i.e. the cam angle signal SGC, can be used for calculating a detected real phase angle value VTA.

The ECU 2 includes a well-known microcomputer 21. The ECU 2 calculates the amount of operation (duty driving signal) via phase angle feedback control calculation and outputs via a driving circuit 24 that duty driving signal to an oil control valve linear solenoid 31 of an oil pressure control solenoid valve (hereinafter referred to as OCV (oil control valve)) 3 acting as a phase angle control actuator such that the real phase angle of the camshaft to the crankshaft 11, which is detected based on the crank angle signal SGT and the cam angle signal SGC, matches a target phase angle VTT determined based on the operation condition of the internal combustion engine 1.

In the OCV 3, the current passing through the OCV linear solenoid 31 is controlled based on the duty driving signal output from the ECU 2. This leads a spool 32 to be positioned at a location where the spool 32 is balanced with biasing force of a spring 33. Consequently, any one of an oil supply passage 45 on the retard angle side and an oil supply passage 46 on the advanced angle side is made communicated with an oil supply passage 42. Oil within an oil tank 44 is then pumped to a variable valve timing mechanism 50, which is shaded in FIG. 1 and provided on one (for example, camshaft 15) of the pair of camshafts 15, 16.

When the oil supply provided to the variable valve timing mechanism 50 is adjusted, the camshaft 15 is rotatable to the timing pulley 13 and thus to the crankshaft 11 by a predetermined phase difference, as well as the camshaft 15 is adjustable to the target phase angle. It should be noted that the oil emitted from the variable valve timing mechanism 50 is returned to the oil tank 44 via an oil emission passage 43.

Figure 2:
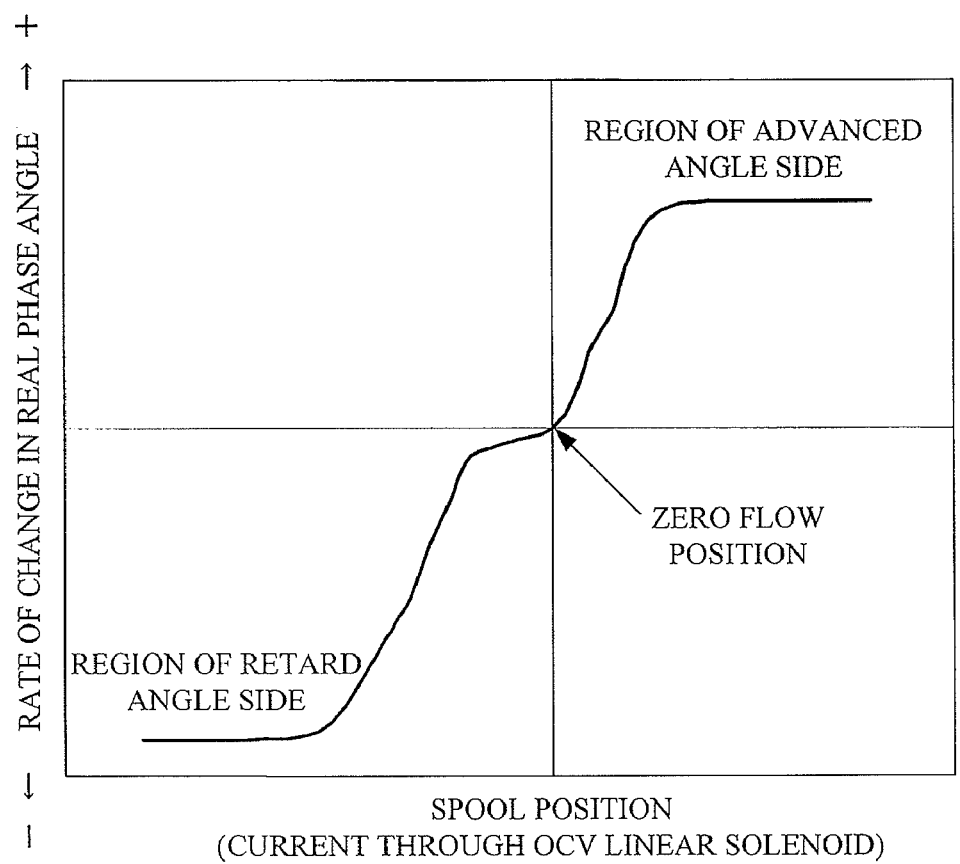
FIG. 2 is a graph illustrating a relationship between a rate of change in phase angle of a phase angle control actuator and a position of a spool.

FIG. 2 is a characteristic diagram illustrating the relationship between the position of the spool 32 (hereinafter referred to as "spool position") within the OCV 3 and the rate of change in the real phase angle.

In this characteristic diagram, the positive region and the negative region of the rate of change in the real phase angle correspond to the region of the advanced angle side and the region of the retard angle side, respectively. The spool position in the horizontal axis of this characteristic diagram is in a proportional relation with the current passing through the linear solenoid. A spool position where the oil supply passage 42 is not communicated with the oil supply passage 45 on the retard angle side nor the oil supply passage 46 on the advanced angle side is the zero flow position illustrated in FIG. 2 (position at which the flow rate output from the OCV 3 becomes 0). The zero flow position equals to a neutral spool position where the real phase angle is not changed.

The microcomputer 21 includes a central processing unit (CPU; not shown) for performing various calculations and decisions, a ROM (not shown) in which predetermined control programs and the like are stored in advance, a RAM (not shown) for temporally storing the results of calculations provided from the CPU and the like, an analog-to-digital converter (not shown) for converting analog voltage values to digital values, a counter CNT (not shown) for counting the cycle of the input signal and the like, a timer (not shown) for measuring the duration of time during which the output signal is driven and the like, and a common bus (not shown) for connecting respective blocks (not shown).

Figure 3:
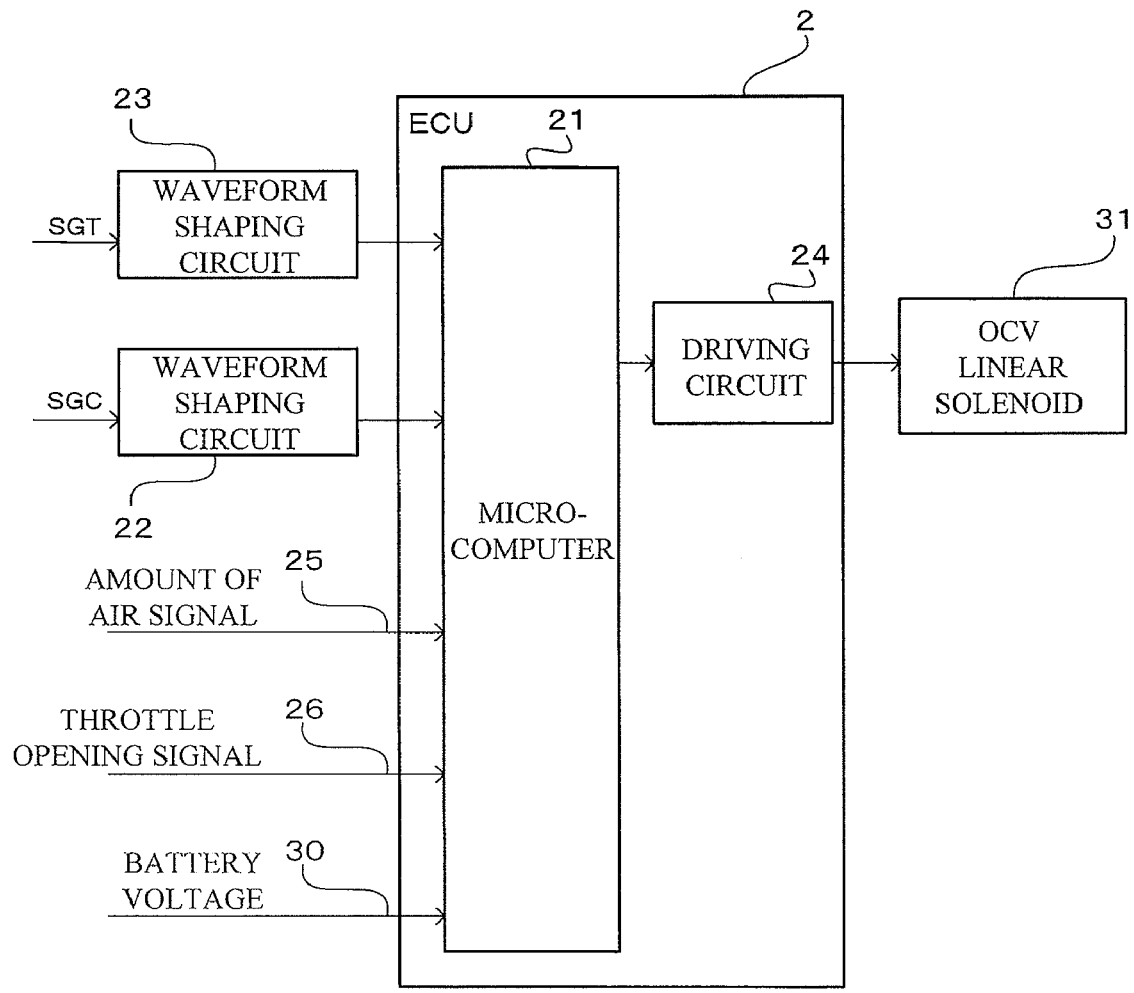
FIG. 3 is a functional block diagram schematically illustrating processing and a configuration of a microcomputer of the present invention.

FIG. 3 is a view schematically illustrating the configuration of the relations on the input and output signals in the ECU 2 regarding the valve timing control of the internal combustion engine according to Embodiment 1 of the present invention.

The crank angle signal SGT provided from the crank angle sensor 17 is waveform-shaped by a waveform shaping circuit 22 and then input to the microcomputer 21 as an interrupt command signal INT1. The cam angle signal SGC provided from the cam angle sensor 18 is waveform-shaped by a waveform shaping circuit 23 and then input to the microcomputer 21 as an interrupt command signal INT2.

In the microcomputer 21, an amount of air signal 25, a throttle opening signal 26, a battery voltage signal 30, a water temperature signal (not shown), and the like are subjected to processing including filtering noise content and amplifying by an input interface circuit (not shown) and then input to the analog-to-digital converter (not shown).

In the microcomputer 21, a target phase angle, which is calculated by target phase angle setting means 27 based on the amount of air data, the number of rotation of the internal combustion engine, and the like, and a real phase angle, which is calculated based on the crank angle signal SGT and the cam angle signal SGC, are input to phase angle feedback control means. The amount of operation calculated through the phase angle feedback control calculation is output to the OCV linear solenoid 31 via a driving circuit 24.

Figure 5:
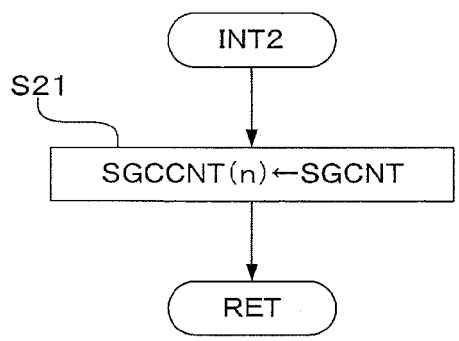
FIG. 5 is a flowchart illustrating interrupt processing of a cam angle signal.

FIG. 5 is a flowchart illustrating the interrupt processing of the cam angle signal SGC.

The cam angle signal SGC provided from the cam angle sensor 18 is waveform-shaped by the waveform shaping circuit 23 and then input to the microcomputer 21 as the interrupt command signal INT2.

In the microcomputer 21, each time the interruption is caused by the interrupt command signal INT2, a counter value SGCCNT of the counter CNT (not shown) is read out and stored in the RAM (not shown) of SGCCNT(n) (Step S21 of FIG. 5).

Figure 6:
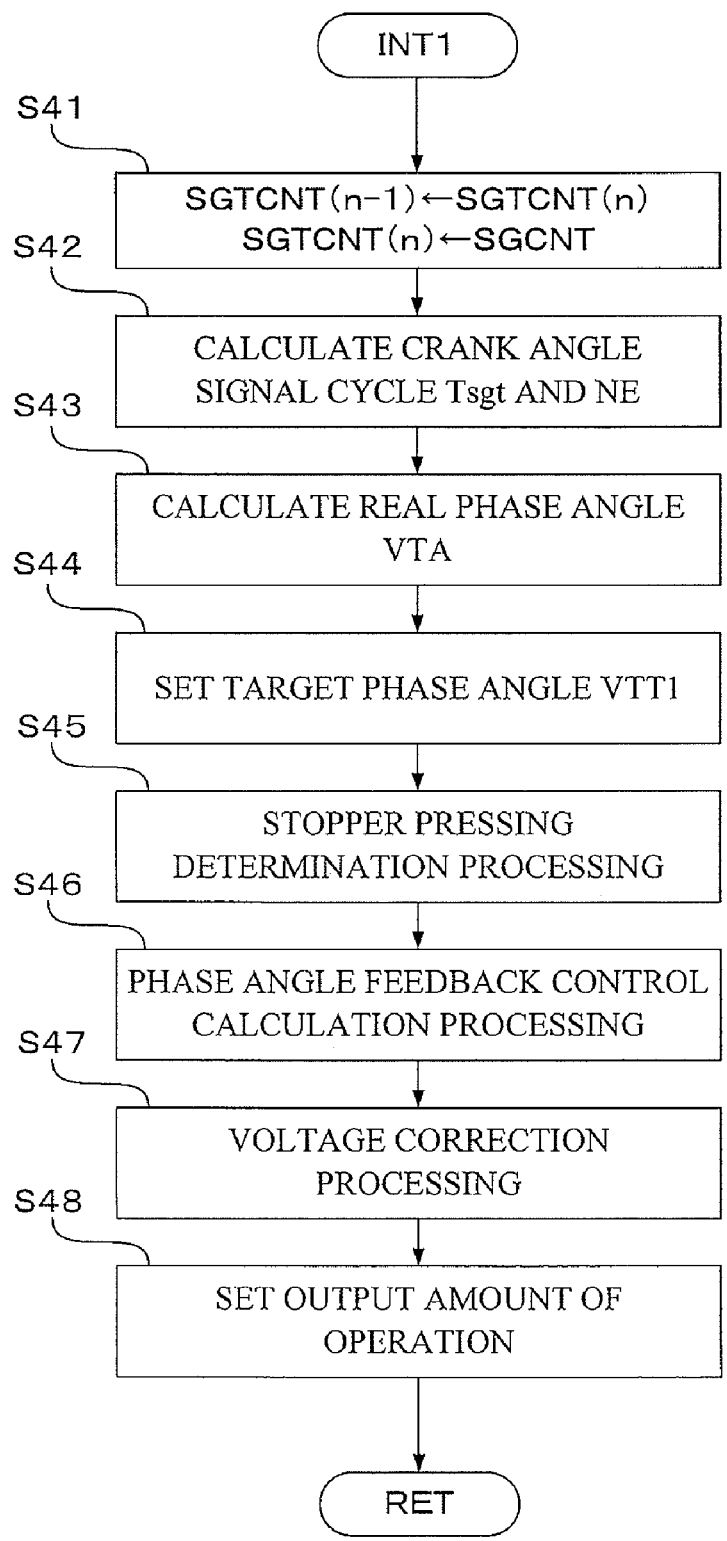
FIG. 6 is a flowchart illustrating interrupt processing of a crank angle signal.

FIG. 6 is a flowchart illustrating the interrupt processing of the crank angle signal SGT.

The crank angle signal SGT provided from the crank angle sensor 17 is waveform-shaped by the waveform shaping circuit 22 and then input to the microcomputer 21 as the interrupt command signal INT1.

In the microcomputer 21, each time the interruption is caused by the interrupt command signal INT1, a counter value SGTCNT(n) stored in the RAM when the crank angle signal SGT is input at the previous time is read out and stored in the RAM of SGTCNT(n−1), while the counter value SGTCNT of the counter CNT, which is stored in the RAM when the crank angle signal SGT is input this time, is read out and stored in the RAM of SGTCNT(n) (Step S41 of FIG. 6).

Then, a cycle Tsgt (=SGTCNT(n)−SGTCNT(n−1)) of the crank angle signal SGT is calculated from the difference between the counter value SGTCNT(n−1) of the counter CNT, which is stored when the crank angle signal SGT is input at the previous time, and the counter value SGTCNT(n) of the counter CNT, which is stored when the crank angle signal SGT is input this time. The number of rotation NE of the internal combustion engine is then calculated based on the crank angle signal cycle Tsgt (Step S42 of FIG. 6).

Then, the microcomputer 21 reads out from the RAM (not shown) the counter value SGCCNT(n) stored when the cam angle signal SGC is input, and then calculates a phase difference time ΔTd (a phase difference time at the most retard angle) or ΔTa (a phase difference time at the most advanced angle) based on the difference between the read-out counter value SGCCNT(n) and the counter value SGTCNT(n) stored when the crank angle signal SGT is input. The microcomputer 21 then calculates a detected real phase angle value VTA based on the cycle Tsgt of the crank angle signal SGT and the reference crank angle (180 degree in crank angle) (Step S43 of FIG. 6). This calculation for the detected real phase angle value VTA is described later in detail.

Then, in the microcomputer 21, the amount of air signal 25, the throttle opening signal 26, the battery voltage signal 30, the water temperature signal (not shown), and the like are subjected to processing including filtering the noise content and amplifying by the input interface circuit (not shown) and then input to the analog-to-digital converter (not shown). The signals are converted into digital data by the analog-to-digital converter. The microcomputer 21 then calculates the target phase angle via the target phase angle setting means 27 based on the amount of air data, the number of rotation of the internal combustion engine, and the like, and limits the upper limit for the target phase angle based on a leaning value full closed position VTSLN of a limit value of the phase angle of the camshaft, which is described later, to set up a first target phase angle VVT1 (Step S44 of FIG. 6).

Then, the microcomputer 21 determines via stopper pressing determination means whether or not the valve timing variable mechanism 50 is pressed against the limiting position defined by the stopper during the feedback control of the rotational phase angle of the camshaft. When it is determined that the valve timing variable mechanism 50 is pressed, the microcomputer 21 switches via target phase angle switching means a first target phase angle VTT1 to a second target phase angle VTT2 (Step S45 of FIG. 6).

The processes for determining whether or not the valve timing variable mechanism 50 is pressed against the limiting position defined by the stopper, for setting the second target phase angle VTT2, and for switching the target phase angle is described later in detail with reference to FIG. 4.

Then, the microcomputer 21 calculates via phase angle feedback means 29 an amount of correction of control Dpid through phase angle feedback control calculation (for example, PID control calculation) such that the detected real phase angle value VTA, which is detected via real phase angle detecting means 28 based on the crank angle signal SGT and the cam angle signal SGC, matches the target phase angle VTT, which is set by the target phase angle setting means 27 based on the amount of air data, the number of rotation of the internal combustion engine, and the like (Step S46 of FIG. 6).

Then, the microcomputer 21 corrects the amount of correction of control Dpid calculated through the phase angle feedback control calculation, with battery voltage correction coefficient KVB (=VBR/VB) which is the ratio of a predetermined reference voltage VBR and battery voltage VB, and then calculates the driving duty value (amount of operation) DDTY of the OCV linear solenoid 31 (Step S47 of FIG. 6).

Then, the microcomputer 21 sets the calculated driving duty value DDTY to pulse width modulation (PWM) timer (not shown) (Step S48 of FIG. 6) to output the PWM driving signal, which is output from the PWM timer with a period of a predetermined PWM driving cycle set in advance, to the OCV linear solenoid 31 via the driving circuit 24.

Figure 7:
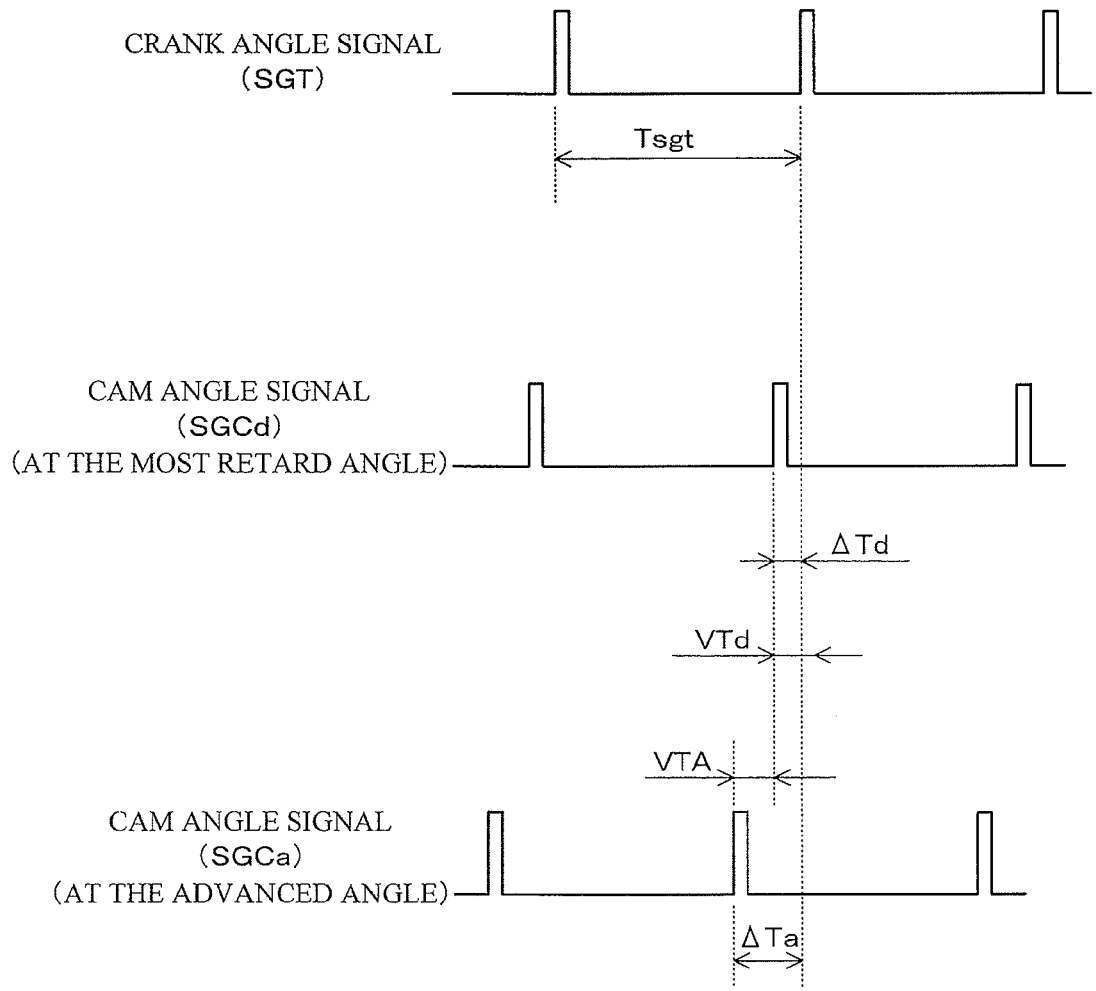
FIG. 7 is a timing chart illustrating the crank angle signal, a cam angle signal at the most retarded angle and a cam angle signal at the advanced angle.

FIG. 7 is a timing chart illustrating the relationship among the crank angle signal SGT, the cam angle signal SGCd at the most retarded angle, and the cam angle signal SGCa at the advanced angle. FIG. 7 is prepared to illustrate the phase relation between the crank angle signal SGT and the cam angle signal SGCd at the most retarded angle and the cam angle signal SGCa at the advanced angle as well as how the detected real phase angle value VTA is calculated.

It is now described with reference to FIG. 7 how the real phase angle detecting means 28 detects the detected real phase angle value VTA, where the real phase angle is a relative phase angle of the camshaft 15 to the crankshaft 11, based on the crank angle signal SGT and the cam angle signal SGC.

The microcomputer 21 measures the cycle Tsgt (=SGTCNT(n)−SGTCNT(n−1)) of the crank angle signal SGT, as well as the phase difference time ΔTa (=SGTCNT(n)−SGCCNT(n)) from the cam angle signal SGCa at the advanced angle to the crank angle signal SGT.

The microcomputer 21 also calculates the most retard valve timing VTd using the equation (1) based on the phase difference time ΔTd (=SGTCNT(n)−SGCCNT(n)) measured when the valve timing is at the most retard angle position and of the crank angle signal cycle Tsgt, and stores the most retard valve timing VTd in the RAM provided in the microcomputer 21. It is noted that 180 (degree in crank angle) is a reference crank angle in which the SGT signal is caused in a four-stroke internal combustion engine.

$$VTd=(\Delta Td/Tsgt)\times 180 \text{ (degree in crank angle)} \quad (1)$$

Further, the microcomputer 21 calculates the detected real phase angle value VTA using the equation (2) below based on the phase difference time ΔTa, the crank angle signal cycle Tsgt, and the most retard valve timing VTd.

$$VTA=(\Delta Ta/Tsgt)\times 180 \text{ (degree in crank angle)}-VTd \quad (2)$$

Figure 4:
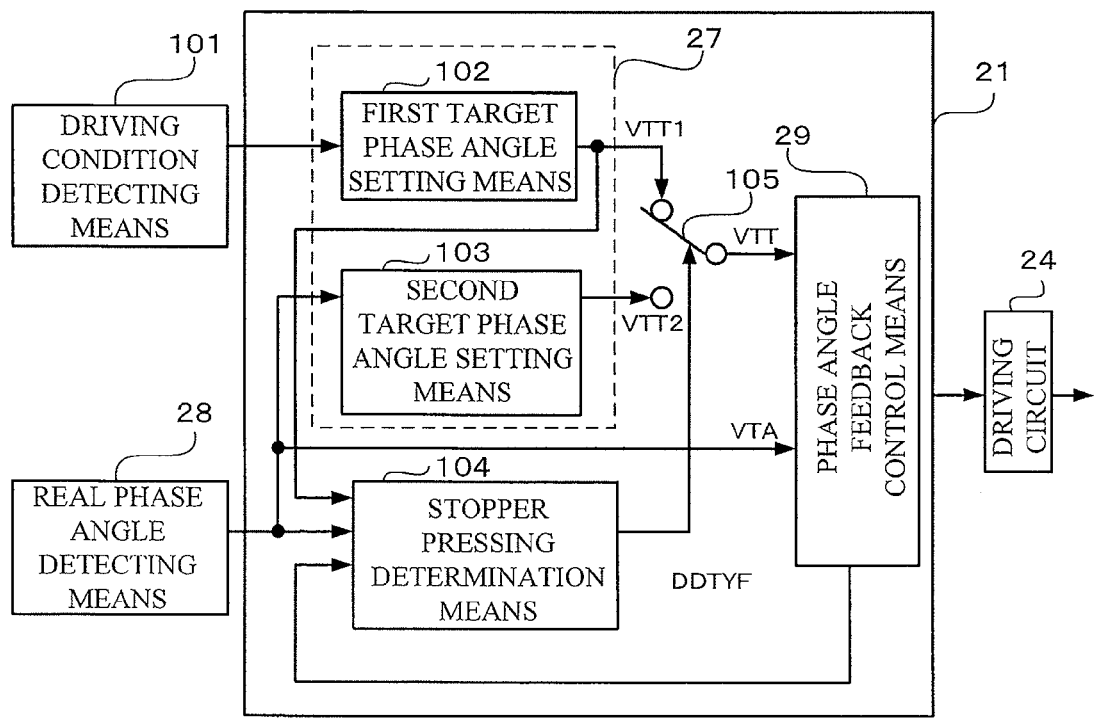
FIG. 4 is a functional block diagram illustrating processing and a configuration for stopper pressing determination of a camshaft.

FIG. 4 is the functional block diagram illustrating the processing and configuration within the microcomputer 21 regarding the stopper pressing determination of the valve timing variable mechanism according to the Embodiment 1 of the present invention.

Stopper pressing determination means 104 determines whether or not the valve timing variable mechanism is pressed against the limiting position defined by the stopper during which the detected rotational phase angle value VTA of the camshaft is subjected to the feedback control by the phase angle feedback control means 29 such that the detected rotational phase angle value VTA of the camshaft equals to the target phase angle VTT set based on the driving condition of the internal combustion engine.

Target phase angle switching means 105 switches based on the result of determination by the stopper pressing determination means 104 between a setting where the target phase angle VTT input to the phase angle feedback control means 29 is set to the first target phase angle VTT1 provided from the first target phase angle setting means 102 and a setting where the target phase angle VTT input to the phase angle feedback control means 29 is set to the second target phase angle VTT2 provided from the second target phase angle setting means 103.

Figure 8:
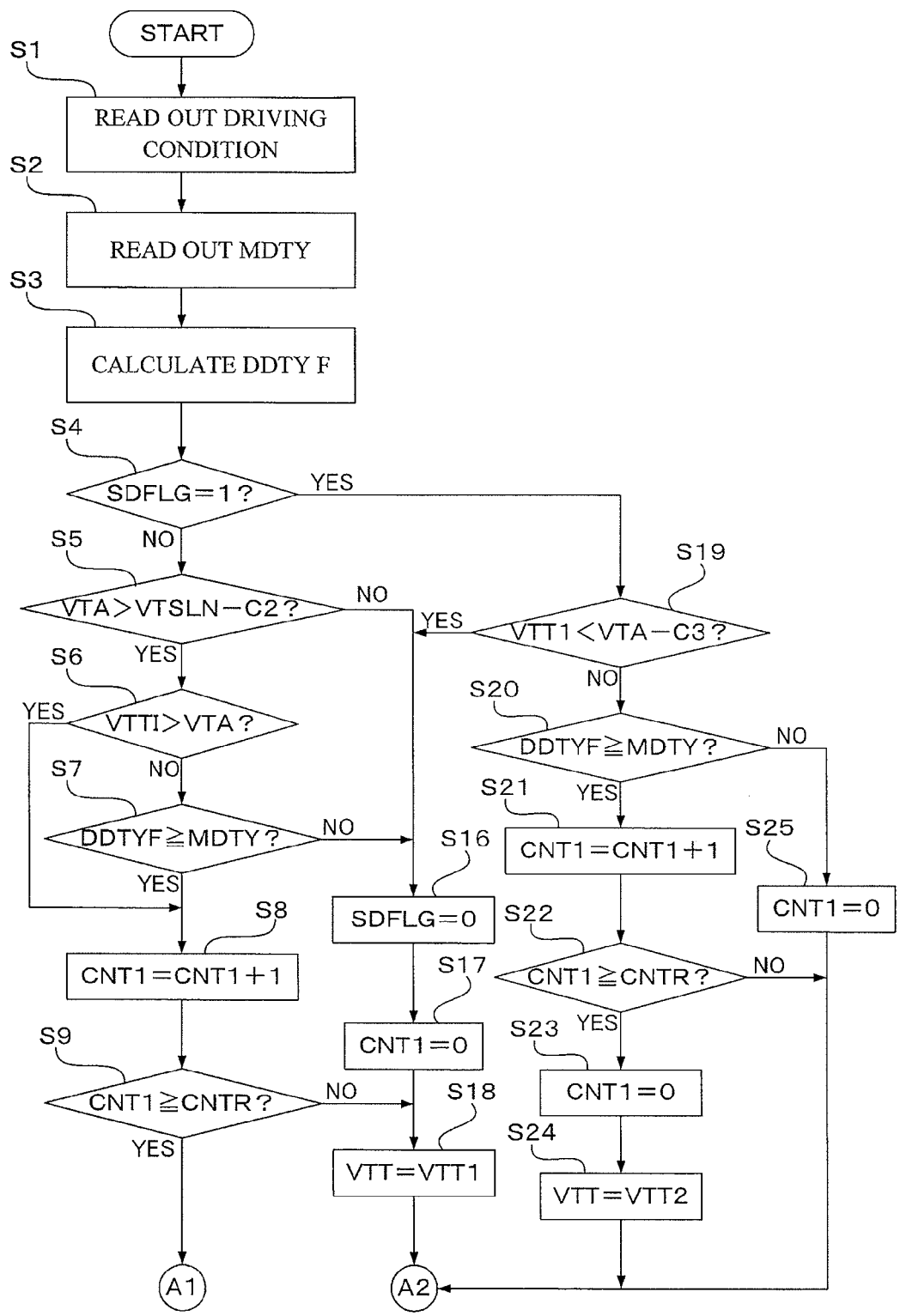
FIG. 8 is a part of a flowchart illustrating the stopper pressing determination processing of the camshaft in Embodiment 1 of the present invention.

FIG. 8 is a process flowchart of operating program within the microcomputer 21 according to Embodiment 1 of the present invention.

When the rotational phase angle of the camshaft is subjected to the feedback control under a condition where the target phase angle is set to the phase angle operating region belonging to the reference value side of the rotational phase angle of the camshaft apart from the limiting value of the phase angle by a second predetermined value or more, the stopper pressing determination means 104 determines that the valve timing variable mechanism is not pressed against the stopper. Accordingly, the target phase angle switching means 105 selects the first target phase angle VTT1 set by the first target phase angle setting means 102, based on the driving condition detected by the driving condition detecting means 101, as the target phase angle VTT for the phase angle feedback control.

The first target phase angle VTT1 and the detected real phase angle value VTA, which is detected by the real phase angle detecting means 28, are provided to the phase angle feedback control means 29. The phase angle feedback control means 29 calculates the driving duty value DDTY for the OCV linear solenoid 31 through the well-known PID control calculation, and outputs the calculated driving duty value DDTY to the driving circuit 24.

On the other hand, when the rotational phase angle of the camshaft is subjected to the feedback control under a condition where the target phase angle is set to the phase angle operating region belonging to the reference value side of the rotational phase angle of the camshaft apart from the limiting value of the phase angle by just the second predetermined value, it is highly likely that the stopper pressing determination means 104 determines that the valve timing variable mechanism is pressed against the stopper. Then, when the stopper pressing determination means 104 determines the stopper pressing, the target phase angle switching means 105 selects the second target phase angle VTT2 set by the second target phase angle setting means 103, as the target phase angle VTT.

The second target phase angle VTT2 and the detected real phase angle value VTA, which is detected by the real phase angle detecting means 28, are input to the phase angle feedback control means 29. The phase angle feedback control means 29 calculates the driving duty value DDTY for the OCV linear solenoid 31 through the well-known PID control calculation, and outputs the calculated driving duty value DDTY to the driving circuit 24.

Figure 9:
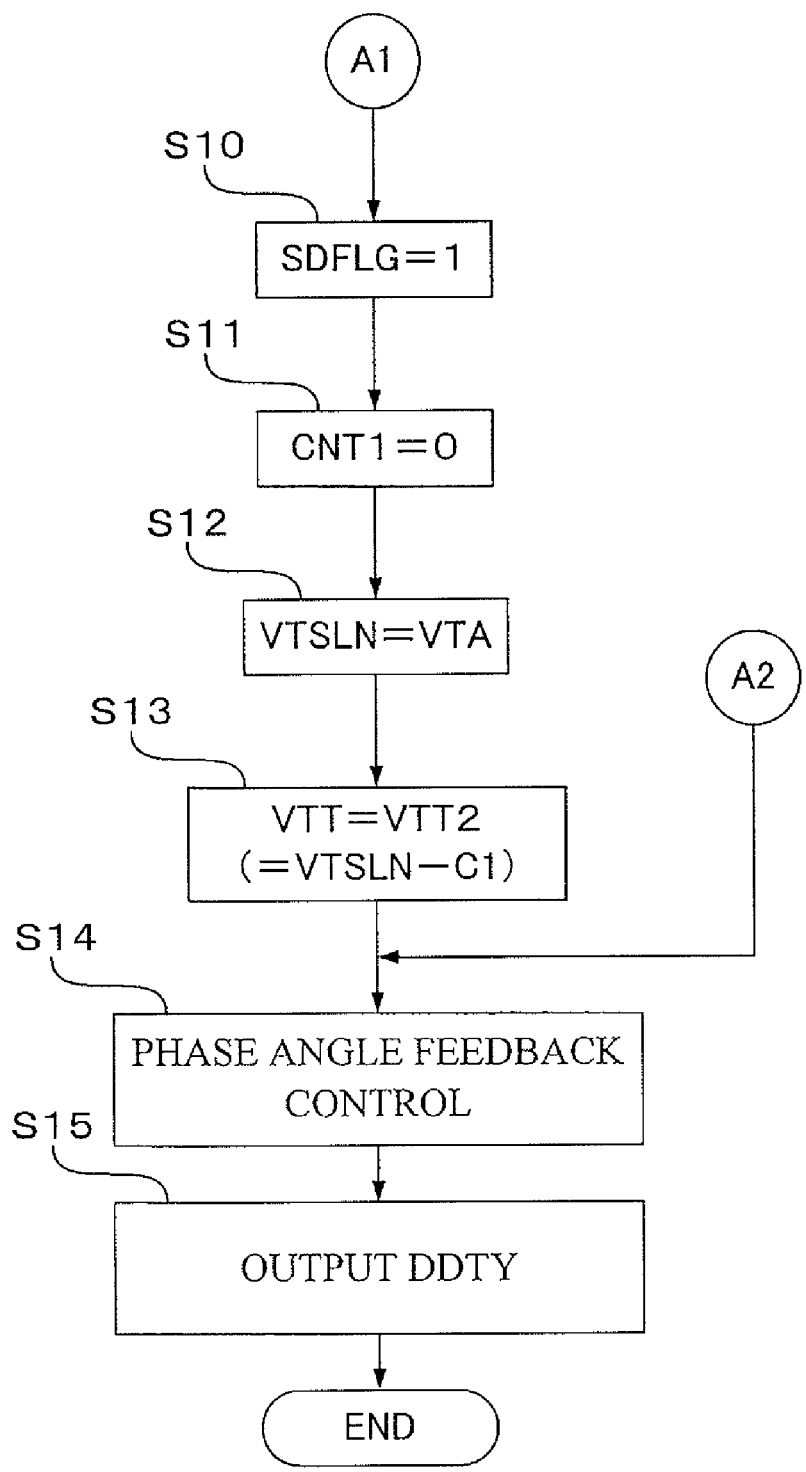
FIG. 9 is the rest of the flowchart illustrating the stopper pressing determination processing of the camshaft in Embodiment 1 of the present invention.

FIGS. 8 and 9 are flowcharts illustrating a procedure of the stopper pressing determination processing of the valve timing variable mechanism performed by the stopper pressing determination means 104.

The stopper pressing determination processing of the valve timing variable mechanism performed by the stopper pressing determination means 104 is now described with reference to the flowcharts illustrated in FIGS. 8 and 9.

In Step S1, the driving condition detecting means 101 for the internal combustion engine detects the battery voltage 30 and the lubricant oil temperature of the internal combustion engine using a temperature sensor (not shown).

In Step S2, in order to determine whether or not the valve timing variable mechanism is pressed against the limiting position defined by the stopper based on the output condition of the driving duty value of the OCV linear solenoid 31, a monitoring duty value MDTY of the OCV linear solenoid 31 is read out from a monitoring duty value table predetermined using the oil temperature and the battery voltage.

Note that, in the monitoring duty value table, the monitoring duty value is a certain driving duty value corresponding to the current value (spool position) of the OCV linear solenoid set in the region of the advanced angle side from the zero flow position at which the phase angle feedback control causes the phase angle deviation and the rate of change in the real phase angle of FIG. 2 to be 0 (for example, the certain driving duty value is 80% when the oil temperature is 90° C. and the battery voltage is 14V, and cannot be output when the phase angle deviation is converged to 0). It is defined that the monitoring duty value increases when the battery voltage decreases or the oil temperature increases.

Then, in Step S3, the driving duty value DDTY of the OCV linear solenoid 31, which is calculated by the phase angle feedback control means 29, is subjected to the well-known filtering process calculation using a predetermined filtering coefficient so that a filtered driving duty value DDTYF is calculated.

Then, in Step S4, the stopper pressing determination means 104 determines whether or not the stopper is pressed. Note that, when the stopper is pressed, the stopper pressing determination flag SDFLG is set to 1.

When it is determined in Step S4 that the stopper is not pressed (SDFLG=0), it is then determined in Step S5 whether or not the detected real phase angle value VTA of the rotational phase angle of the camshaft is within a given region of the rotational phase angle of the camshaft (VTA>VTSLN−C2) where the given region is extended within a range from the learned full closed position VTSLN (for example, 40 degree in crank angle) of the limiting phase angle value to a rotational phase angle located in a second predetermined value C2 (for example, 5 degree in crank angle) distance from the learned full closed position VTSLN in a direction to the reference rotational phase angle value of the camshaft (for example, 0 degree in crank angle). The procedure goes to Step S6 when VTA is more than a value obtained by subtracting C2 from VTSLN, whereas the procedure goes to Step S16 when VTA is equal to or less than the value obtained by subtracting C2 from VTSLN.

When it is determined in Step S5 that the detected real phase angle value VTA of the rotational phase angle of the camshaft is within a given region of the rotational phase angle of the camshaft (VTA>VTSLN−C2) where the given region is extended within a range from the learned full closed position VTSLN (for example, 40 degree in crank angle) of the limiting phase angle value to a rotational phase angle located in a second predetermined value C2 (for example, 5 degree in crank angle) distance from the learned full closed position VTSLN in a direction to the reference rotational phase angle value of the camshaft (for example, 0 degree in crank angle), it is then determined in Step S6 whether or not the first target phase angle VTT1 is more than the detected real phase angle value VTA (in a direction apart from the reference phase angle value). The procedure goes to Step S8 when VTT1 is more than VTA, whereas the procedure goes to Step S7 when VTA is equal to or less than VTA.

When it is determined that VTT1 is equal to or less than VTA, it is then determined in Step S7 whether or not the filtered driving duty value DDTYF of the OCV linear solenoid 31 is equal to or more than the monitoring duty value MDTY. The procedure goes to Step S8 when it is determined that DDTYF is equal to or more than MDTY, whereas the procedure goes to Step S16 when it is determined that DDTYF is less than MDTY.

In Step S8, as the stopper pressing determination condition (VTT1>VTA or DDTYF>MDTY) is satisfied in Step S6 or Step S7, the stopper pressing determination counter CNT1 is incremented by 1 (CNT1=CNT1+1), and the procedure then goes to Step S9. It is determined in Step S9 whether or not the stopper pressing determination counter CNT1 is more than a predetermined duration of time CNTR (for example, 1 second). The procedure goes to Step S18 when CNT1 is less than CNTR (CNT1<CNTR) because the stopper pressing determination has not become definite, whereas the procedure goes to Step S10 when CNT1 is equal to or more than CNTR (CNT1≧CNTR) because the stopper pressing determination is fixed.

In Step S10, the stopper pressing determination flag is set (SDFLG=1) because the stopper pressing determination is fixed in Step S9.

In Step S11, the stopper pressing determination counter is reset (CNT1=0).

In Step S12, the detected rotational phase angle value VTA of the camshaft at the time when it is determined that the valve timing variable mechanism is pressed against the limiting position defined by the stopper, is learned as the learned full closed position VTSLN of the limiting rotational phase angle value of the camshaft.

In Step S13, it is determined by the stopper pressing determination means 104 that the valve timing variable mechanism is pressed against the limiting position defined by the stopper, and hence the second target phase angle setting means 103 increases the target phase value VTT for the phase angle feedback in a direction of the reference rotational phase angle value side of the camshaft by a first predetermined value C1 (for example, 0.5 degree in crank angle) from the learned full closed position VTSLN of the limiting rotational phase angle value of the camshaft, and then the procedure goes to Step S14.

In Step S14, the driving duty value DDTY for the OCV linear solenoid 31 is calculated through the PID control calculation.

In Step S15, the calculated driving duty value DDTY is output to the driving circuit 24, and the series of processes is terminated.

In Step S16, the stopper pressing flag is cleared (SDFLG=0).

In Step S17, the stopper pressing determination counter is reset (CNT1=0).

In Step S18, the target phase angle VTT is set to the first target phase angle VTT1.

In Step S19, as it is a case where it is determined that the valve timing variable mechanism is pressed (the stopper pressing determination flag is set: SDFLG=1), it is determined whether or not the first target phase VTT1 is set in the side of the reference rotational phase angle value of the rotational phase angle of the camshaft by a third predetermined value C3 (for example, 1.5 degree in crank angle) from the detected real phase angle value VTA of the rotational phase angle of the camshaft. When the first target phase VVT1 is set in the side of the reference phase angle value (VTT1<VTA−C3), the stopper pressing determination control process is deactivated, and the procedure goes to Step S16 in order to control the detected real phase angle value VTA such that it follows the first target phase angle VTT1.

On the other hand, when the first target phase VTT1 is not set in the reference rotational phase angle value side (VTT1≧VTA−C3) in Step S19, the procedure goes to Step S20.

In Step S20, it is determined whether or not the filtered driving duty value DDTYF of the driving duty value DDTY of the OCV linear solenoid 31 is more than the monitoring duty value MDTY. The procedure goes to Step S21 when it is determined that DDTYF is equal to or more than MDTY (DDTYF≧MDTY), whereas the procedure goes to Step S25 when it is determined that DDTYF is less than MDTY (DDTYF<MDTY).

In Step S25, the stopper pressing determination counter CNT1 is reset (CNT1=0), and the procedure goes to Step S14.

In Step S21, the stopper pressing determination counter CNT1 is incremented (CNT1=CNT1+1).

In Step S22, it is determined whether or not the stopper pressing determination counter CNT1 is more than the predetermined duration of time CNTR (for example, 1 second). The procedure goes to Step S14 when it is determined that CNT1 is less than CNTR (CNT1<CNTR), whereas the procedure goes to Step S23 when it is determined that CNT1 is equal to or more than CNTR (CNT1≧CNTR).

In Step S23, since the stopper pressing condition is continuing, the stopper pressing determination counter CNT1 is reset (CNT1=0).

In Step S24, the target phase angle VTT for the phase angle feedback is set to a larger one of a second phase angle VTT2, which is increased to the reference rotational phase angle value side of the camshaft by the first predetermined value C1 (for example, 0.5 degree in crank angle) from the second target phase angle VTT2 just before the determination in Step S22 (VIT2=VTT2−C1), and a phase angle value (VTSLN−CLMT) increased to the reference rotational phase angle value side of the camshaft by a predetermined limiting value CLMT from the learned full closed position VTSLN of the phase angle limiting value (MAX=[(VTT2−C1), (VTSLN−CLMT)]), and the procedure then goes to Step S14.

Figure 10:
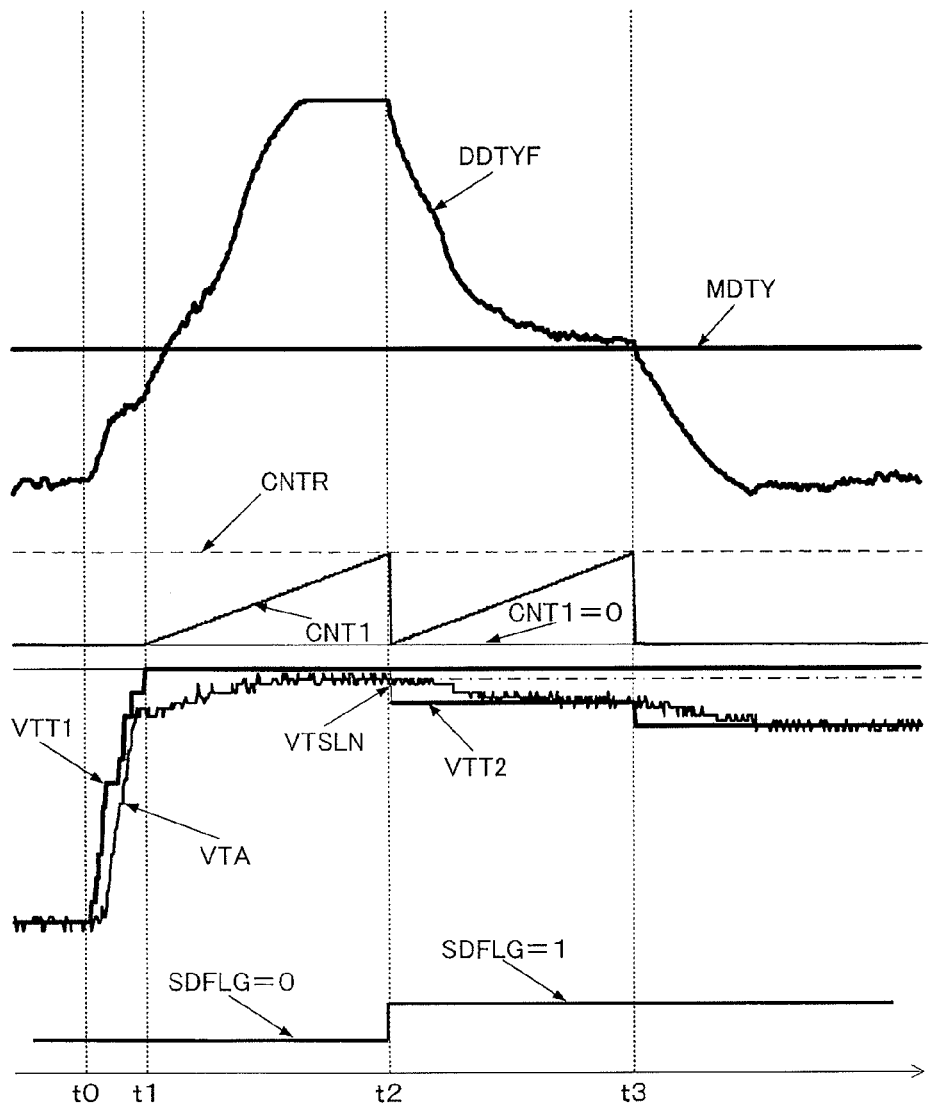
FIG. 10 is a time diagram illustrating the stopper pressing determination processing of the camshaft in Embodiment 1 of the present invention.

FIG. 10 is a time diagram illustrating the control operation when the stopper pressing determination means 104 determines that the valve timing variable mechanism is pressed against the limiting position defined by the stopper.

In FIG. 10, the behavior changes, during the phase angle feedback control of the rotational phase angle of the camshaft, of the filtered driving duty value DDTYF of the driving duty value of the OCV linear solenoid, the monitoring duty value MDTY, the counter value of the stopper pressing determination counter CNT1, the reference determination value CNTR of the stopper pressing determination counter, the previous and current learned full closed portions VTSLNO and VTSLN of the phase angle limiting value of the rotational phase angle of the camshaft, the first phase angle VTT1, the second target phase angle VTT2, the detected real phase angle value VTA, and the stopper pressing determination flag SDFLG is illustrated on a temporal axis.

Before the point of time t0, the target phase angle switching means 105 sets the first target phase angle VTT1, which is calculated by the first target phase value setting means 102, to the target phase angle VTT. Also, the detected real phase angle value VTA is controlled to the first phase angle VTT1 by the phase angle feedback control means 29 such that the phase angle deviation becomes 0 (=VTT1−VTA). Further, the filtered driving duty value DDTYF of the driving duty value of the OCV linear solenoid is controlled to the driving duty value DDTY (for example, 50%, when the oil temperature is 90% and the battery voltage is 14V) corresponding to the current value of the OCV linear solenoid 31 for keeping the zero flow position of the OCV linear solenoid valve in FIG. 2.

The phase angle deviation (=VTT1−VTA) increases when the first target phase angle setting means 102 increases the target phase angle VTT1 in a direction of the previous learned full closed position VTSLNO of the limiting phase angle value of the rotational phase angle of the camshaft at the point of time t0. Therefore, the phase angle feedback control means 29 increases the output driving duty value DDTY (not shown) of the OCV linear solenoid 31 and therefore the filtered driving duty value DDTYF also increases.

At the point of time t1, the target phase angle VTT1 is set to the previous learned full closed position VTSLNO of the limiting phase angle value of the rotational phase angle of the camshaft. Also, the detected real phase angle value VTA reaches a phase angle region set to the reference phase angle value side by the second predetermined value C2 (for example, 5 degree in crank angle) from the previous learned full closed position VTSLNO of the limiting phase angle, and the phase angle deviation (=VTT1−VTA) becomes positive (>0). Consequently, the stopper pressing determination means 104 determines that the stopper pressing determination condition is satisfied, and the stopper pressing determination counter CNT1 starts to count up. In this state, the stopper pressing determination flag SDFLG is cleared (SDFLG=0).

Since the filtered driving duty value DDTYF of the OCV linear solenoid increases as time advances and exceeds the monitoring duty value MDTY, the stopper pressing determination condition is continuing to be satisfied even when the stopper pressing condition continues in the state where the phase angle deviation is 0.

At the point of time t2 at which the counter value of the stopper pressing determination counter CNT1 reaches the determination reference value CNTR, the stopper pressing determination means 104 determines the stopper pressing, and the detected real phase angle value VTA is learned as the current learned full closed position VTSLN of the limiting rotational phase angle value of the camshaft. Also, the second target phase angle setting means 103 sets the second target phase angle VTT2 (=VTSLN−C1) to the reference phase angle value side by the first predetermined value C1 (for example, 0.5 degree in crank angle) from the leaning value of the limiting phase angle value, and the target phase angle switching means 105 switches the target phase angle from the first target phase angle VTT1 to the second target phase angle VTT2. At that time, the stopper pressing determination means 104 sets the stopper pressing determination flag SDFLG (SDFLG=1) and resets the stopper pressing determination counter CNT1 (CNT1=1).

Since the target phase angle VTT, which is provided to the phase angle feedback control means 29, is switched from the first target phase angle VTT1 to the second target phase angle VTT2 at the time of the stopper pressing determination, and the target phase angle is changed in a direction of the reference phase angle value, the phase angle deviation decreases and therefore the filtered driving duty value DDTYF of the OCV linear solenoid 31 decreases.

However, since the filtered driving duty value DDTYF of the OCV linear solenoid 31 is more than the monitoring duty value MDTY and the stopper pressing condition is continuing even when the phase angle deviation becomes 0, the stopper pressing determination counter CNT1 continues counting up.

Then, at the point of time t3 at which the stopper pressing determination counter CNT1 reaches the determination reference value CNTR, the stopper pressing determination means 104 performs the stopper pressing determination again, and the second target phase angle setting means 103 increases the second target phase angle VVT2 (=VTT2−C1) again to the reference phase angle side by the first predetermined value C1 (for example, 0.5 degree in crank angle) from the currently-set second target phase angle VTT2 and inputs the second target phase angle VVT2 to the phase angle feedback control means.

The phase angle feedback control means 29 decreases the filtered driving duty value DDTYF of the OCV linear solenoid 31 less than the monitoring duty value MDTY through the phase angle feedback control, and reduces the current passing through the OCV linear solenoid 31 to the current at the time when a normal phase angle control is performed. Then, when the current value passing through the OCV linear solenoid 31 is reduced to the current value at the time of the normal phase angle control, the state where the rotational phase angle of the camshaft is pressed against the limiting phase angle value is released and it is ensured that the rotational phase angle of the camshaft is kept around the limiting phase angle value.

Though it is not shown in the time diagram of operations of FIG. 9, the stopper pressing determination flag SDFLG is cleared (SDFLG=0) when the first target phase angle VVT1 is updated to the reference phase angle value side by the third predetermined value C3 from the detected real phase angle value VTA in the state where the rotational phase angle of the camshaft is kept around the limiting phase angle value. The target phase angle switching means 105 then switches the target phase angle VTT to the first target phase angle VTT1 and inputs the target phase angle VTT to the phase angle feedback control means 29 so that the detected real phase angle value VTA is controlled swiftly so as to follow the first target phase angle VTT1.

As stated above, according to the valve timing controller for the internal combustion engine of the present invention, it is possible to achieve an effect that the overcurrent state of the actuator can be avoided and the phase angle of the camshaft can be stably held around the limiting phase angle value defined by the stopper with the required minimum power consumption.

According to the valve timing controller for the internal combustion engine of the present invention, when the phase angle of the camshaft is controlled to the limiting position defined by the stopper, the striking speed to the stopper is highly reduced by the convergence behavior (in which the real phase angle gradually reaches the target phase angle) caused by the phase angle feedback control. Also, it is possible to avoid inadvertent pressings to the stopper position when the target phase angle value is set to a value larger than the actual limiting phase angle value, which are caused by variation of the limiting (stopper) position of the rotational phase angle variable mechanism of the camshaft and detection error of the phase angle detecting means. Consequently, it is possible to achieve an effect that the durability of the stopper of the valve timing variable mechanism can be increased.

According to the valve timing controller for the internal combustion engine of the present invention, erroneous decision is not caused even when an erroneous behavior, in which the real phase angle does not properly follow except for the stopper position, is caused by any factor, and hence it is possible to achieve an effect that a state where the valve timing variable mechanism is pressed against the limiting position defined by the stopper can be assuredly detected.

According to the valve timing controller for the internal combustion engine of the present invention, it is possible to achieve an effect that a state where the valve timing variable mechanism is pressed against the limiting position defined by the stopper under a condition that the limiting phase angle position defined by the stopper of the camshaft is out of alignment to the reference phase angle value side of the camshaft by the variation of the valve timing variable mechanism or erroneous detection of the phase angle of the camshaft, can be assuredly detected without erroneous detection.

According to the valve timing controller for the internal combustion engine of the present invention, it is possible to achieve an effect that a state where the valve timing variable mechanism is pressed against the limiting position defined by the stopper while the overcurrent passes through the actuator under a condition that the phase angle control deviation is 0 because of deflection of the stopper position or a condition that the phase angle control deviation is frequently switching between positive and negative with a center on 0 because of the variation of the detected phase angle of the camshaft at quantum level can be detected with a high degree of accuracy.

According to the valve timing controller for the internal combustion engine of the present invention, it is possible to achieve an effect that a state where the valve timing variable mechanism is pressed against the limiting position defined by the stopper can be detected with a high degree of accuracy even when the amount of operation of the actuator, which is calculated through the phase angle feedback control calculation, changes because noise is superimposed on the phase angle detection signal of the camshaft.

According to the valve timing controller for the internal combustion engine of the present invention, since the monitoring value of the amount of operation is set based on information (for example, temperature and battery voltage) detected by the driving condition detecting means, it is possible to achieve an effect that the overcurrent condition of the actuator in a state where the valve timing variable mechanism is pressed against the limiting position defined by the stopper can be detected with a high degree of accuracy even when the temperature of the actuator or the battery voltage changes.

According to the valve timing controller for the internal combustion engine of the present invention, it is possible to achieve an effect that a state where the phase angle of the camshaft is pressed against the limiting phase angle position can be assuredly released to avoid the condition that the overcurrent is provided to the actuator, as well as the actuator can be stably controlled to the phase angle, where the rotational phase angle of the camshaft is slightly returned to the reference phase angle value side from the limiting phase angle value, with the required minimum power consumption.

According to the valve timing controller for the internal combustion engine of the present invention, the second target phase angle value, which is updated by the second phase angle setting means, is limited to a phase angle value set by a predetermined value from the learned limiting rotational phase angle value of the camshaft to the reference rotational phase angle value side of the camshaft, and hence it is possible to achieve an effect that the range of control behavior of the rotational phase angle of the camshaft can be avoided to be narrowed more than necessary.

According to the valve timing controller for the internal combustion engine of the present invention, it is possible to achieve an effect that the rotational phase angle of the camshaft can be caused to rapidly follow the first target phase angle, which is set based on control needs for the engine.

Embodiment 2

Figure 11:
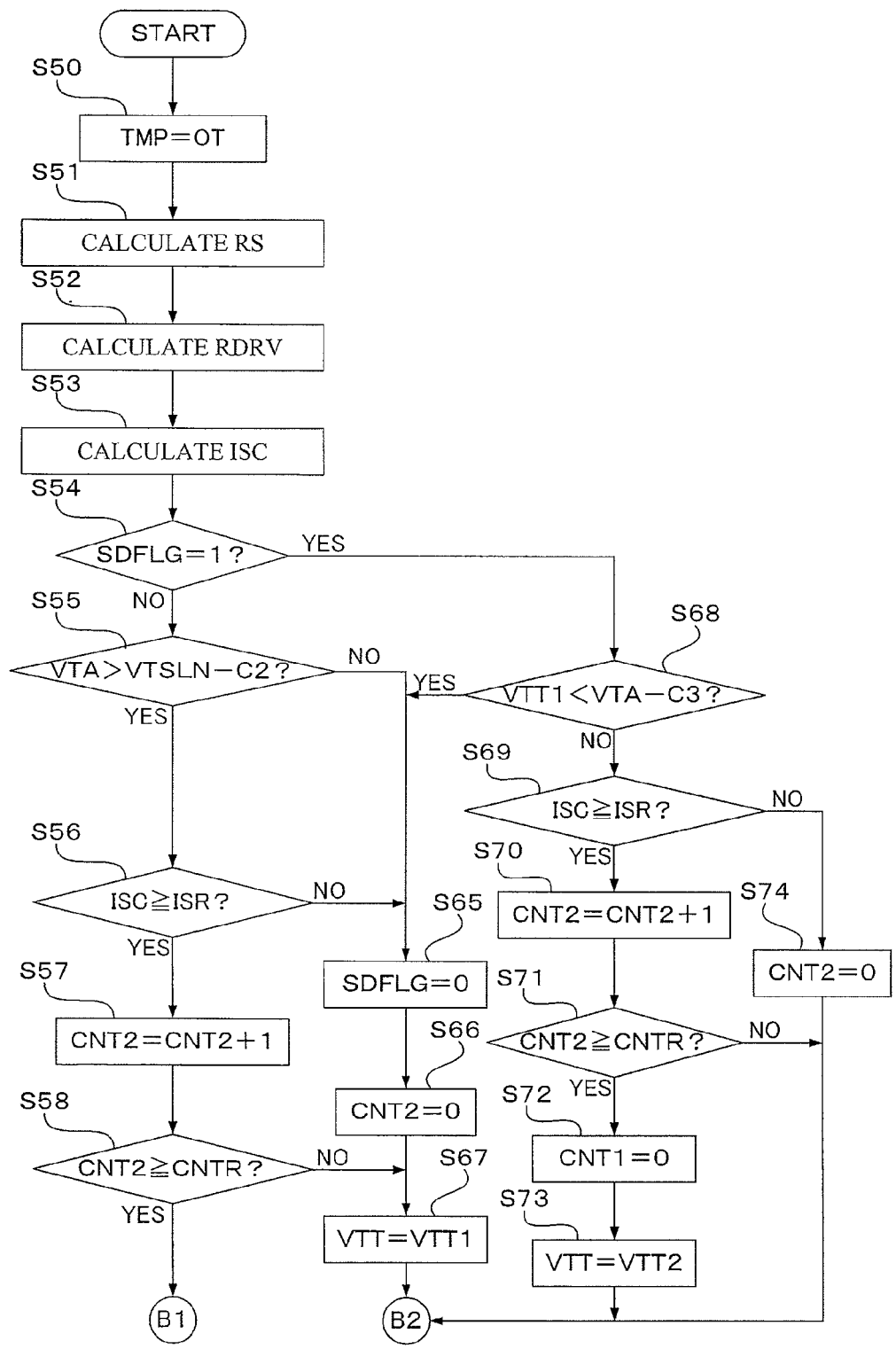
FIG. 11 is a part of a flowchart illustrating a stopper pressing determination processing of a camshaft in Embodiment 2 of the present invention.
Figure 12:
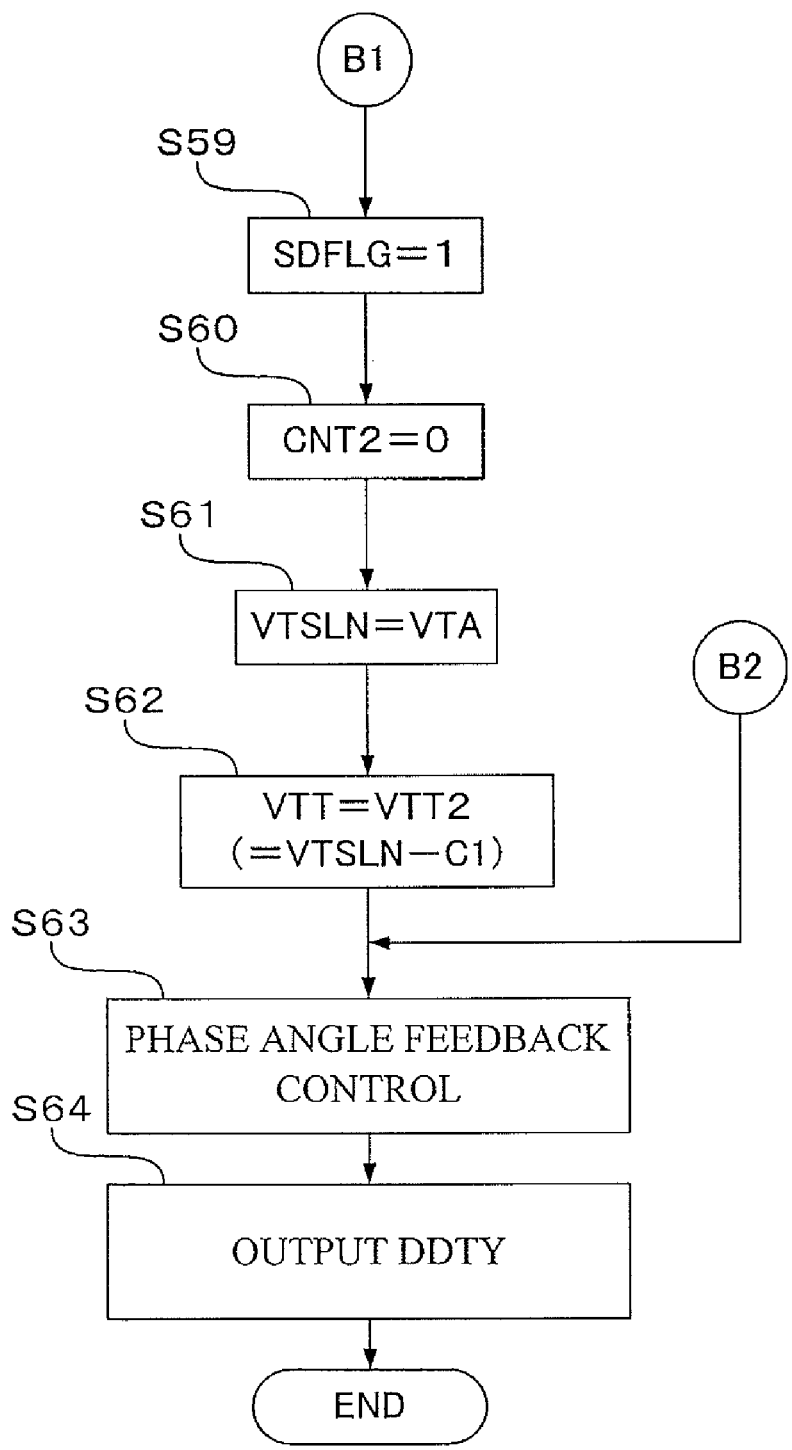
FIG. 12 is the rest of the flowchart illustrating the stopper pressing determination processing of the camshaft in Embodiment 2 of the present invention.

FIGS. 11 and 12 are flowcharts illustrating the stopper pressing determination processing according to the Embodiment 2 of the present invention, in which the stopper pressing determination means controls the rotational phase angle of the camshaft to the limiting phase angle value defined by the stopper.

The stopper pressing determination means 104 according to the Embodiment 1 performs the stopper pressing determination based on the phase angle deviation and the driving duty value provided to the OCV linear solenoid, whereas the stopper pressing determination means 104 according to the Embodiment 2, when performing the stopper pressing determination based on the condition of the control parameter during the phase angle feedback control to the first target phase angle VTT1, determines that the valve timing variable mechanism is pressed against the limiting phase angle position defined by the stopper when a predetermined duration of time is continuing under a condition where a current value passing through the OCV linear solenoid exceeds a predetermined value, which current value is calculated by the driving circuit resistance value estimated based on the temperature parameter, the battery voltage, and the driving duty value of the OCV linear solenoid.

In Step S50, the output value of the oil temperature sensor (not shown), which is input to the ECU 2, is provided to the analog-to-digital converter (not shown) built in the microcomputer 5 as the oil temperature (OT) of the lubricant oil and is then read out as the temperature parameter (TMP=OT) for estimating the coil resistance value RS of the OCV linear solenoid 31. The procedure then goes to Step S51.

In Step S51, coil resistance value RS of the OCV linear solenoid 31 is calculated by applying the temperature parameter TMP to the equation (3), and the procedure then goes to Step S52. It is noted that Ktmp is a resistance-temperature coefficient and R0 is an offset resistance value.

$$RS = Ktmp \times TMP + R0 \qquad (3)$$

In Step S52, an OCV linear solenoid driving circuit resistance value RDRV is calculated by adding a predetermined OCV linear solenoid harness resistance value RHN and an ON resistance value RTR of a linear solenoid driving element to the OCV linear solenoid coil resistance value RS, and the procedure then goes to Step S53.

In Step S53, a linear solenoid current value ISC passing through the coil of the OCV linear solenoid 31 is estimated by applying the battery voltage VB (which is the same as the input in Embodiment 1), the OCV linear solenoid driving duty value DDTY, and the OCV linear solenoid driving circuit resistance value RDRV to the equation (4), and the procedure then goes to Step S54.

$$ISC = VB \times DDTY / RDRV \qquad (4)$$

In Step S4, it is determined whether or not the stopper pressing determination flag SDFLG is set (=1). The procedure goes to Step S68 when the stopper pressing determination flag SDFLG is set (=1), whereas the procedure goes to Step S55 when the stopper pressing determination flag SDFLG is not set (=0).

In Step S55, it is determined whether or not the detected real phase angle value VTA, which is detected by the real phase angle detecting means 28, is within a given region (VTA>VTSLN−C2) extending within the second predetermined value C2 (for example, 5 degree in crank angle) to the reference phase angle side from the learned full closed position VTSLN of the limiting phase angle value of the rotational phase angle of the camshaft. The procedure goes to Step S56 when VTA is within that given region, whereas the procedure goes to Step S65 when VTA is not within that given region.

In Step S56, which is a case where it is determined that the detected real phase angle value VTA of the rotational phase angle of the camshaft is within the phase angle region: VTA>VTSLN−C2, it is now determined whether or not the OCV linear solenoid current value ISC is equal to or more than a predetermined value ISR. The procedure goes to Step S57 when it is determined that the OCV linear solenoid current value ISC is equal to or more than a predetermined value ISR since this is a case where the overcurrent is provided to the OCV linear solenoid 31, whereas the procedure goes to Step S65 when the OCV linear solenoid current value ISC is less than the predetermined value ISR since it is determined that the valve timing variable mechanism is not pressed against the limiting position of the rotational phase angle of the camshaft defined by the stopper.

In Step S57, in a case where it is determined in Step S56 that the OCV linear solenoid current value ISC is equal to or more than a predetermined value ISR (for example, 0.8) (ISC≧ISR), it is determined that the valve timing variable mechanism is pressed against the limiting position of the rotational phase angle of the camshaft defined by the stopper, and the stopper pressing determination counter CNT2 for clocking time of the stopper pressing state is then incremented (CNT2=CNT2+1). The procedure then goes to Step S58.

In Step S58, it is determined whether or not the stopper pressing determination counter CNT2 reaches and exceeds the predetermined value CNTR (for example, 1 second). The procedure goes to Step S67 when the stopper pressing determination counter CNT2 does not reaches or exceeds the predetermined value CNTR, whereas the procedure goes to Step S59 when it is determined that the stopper pressing determination counter CNT2 reaches and exceeds the predetermined value CNTR.

In Step S59, it is determined that the stopper is pressed under a condition that the overcurrent is provided to the OCV linear solenoid 31, and the stopper pressing determination flag SDFLG is set (=1). The procedure then goes to Step S60.

In Step S60, the stopper pressing determination counter CNT2 is cleared (=0) for the determination of continuation, and the procedure then goes to Step S61.

In Step S61, the detected real phase angle value VTA at the stopper pressing determination is learned and stored as the learned full closed position VTSLN of the limiting phase angle value, and the procedure then goes to Step S62.

In Step S62, the target phase angle VTT for the phase angle feedback control is set to the second target phase angle VTT2, which is calculated by subtracting the first predetermined value C1 (for example, 0.5 degree in crank angle) from the learned full closed position VTSLN of the limiting phase angle value, and the procedure then goes to Step S63.

In Step S63, the OCV linear solenoid driving duty value DDTY is calculated through the feedback control (for example, PID control) calculation in which the detected real phase angle value VTA is controlled to coincident with the target phase angle VTT, and the procedure then goes to Step S64.

In Step S64, the rotational phase angle of the camshaft is driven and controlled by providing the OCV linear solenoid driving duty value DDTY as the amount of operation to the OCV linear solenoid 31, to thereby drive the same.

In Step S65, which is a case where the first target phase angle VTT1, which is set in accordance with the engine control request, is set to the reference phase angle value side from the learned limiting phase angle value, the stopper pressing determination processing is stopped and the stopper pressing determination flag SDFLG is cleared (=0) such that the detected real phase angle value VTA is controlled to leave from the second target phase angle VTT2 around the limiting phase angle value and to follow the first target phase angle. The procedure then goes to Step S66.

In Step S66, the stopper pressing determination counter CNT2 for clocking time of the stopper pressing state is cleared (=0), and the procedure then goes to Step S67.

In Step S67, the target phase angle VTT for the phase angle feedback control is set to the first target phase angle VTT1, which is set based on the engine control request, and the procedure then goes to Step S63.

On the other hand, in a case where the stopper pressing determination flag SDFLG is set (=1) in Step S54, the processings for the stopper pressing determination are performed in Step S68 and later.

In Step S68, it is determined whether or not the first target phase angle VTT1, which is set based on the engine control request, is less than a phase angle, which is calculated by subtracting the third predetermined value C3 (for example, 1.5 degree in crank angle) from the detected real phase angle value VTA (VTT1<VTA−C3). The procedure goes to Step S65 when it is determined that VTT1<VTA−C3, whereas the procedure goes to Step S69 when it is determined that VTT1≧VTA−C3.

In Step S69, since this is a case where the first target phase angle VTT1, which is set based on the engine control request, is equal to or more than the phase angle, which is calculated by subtracting the third predetermined value C3 (for example, 1.5 degree in crank angle) from the detected real phase angle value VTA (VTT1≧VTA−C3), it is now determined whether or not the OCV linear solenoid current value ISC is equal to or more than the predetermined value ISR in order to continue the stopper pressing determination processing. The procedure goes to Step S70 when the OCV linear solenoid current value ISC is equal to or more than the predetermined value ISR, whereas the procedure goes to Step S74 when the OCV linear solenoid current value ISC is less than the predetermined value ISR.

In Step S70, the stopper pressing determination counter CNT2 is incremented (CNT2=CNT2+1), and the procedure then goes to Step S71.

In Step S71, it is determined whether or not the stopper pressing determination counter CNT2 reaches or exceeds the predetermined value CNTR. The procedure goes to Step S63 when the stopper pressing determination counter CNT2 does not reach the predetermined value CNTR, whereas the procedure goes to Step S72 when the stopper pressing determination counter CNT2 reaches or exceeds the predetermined value CNTR.

In Step S72, the stopper pressing determination counter CNT1 is cleared (=0), and the procedure then goes to Step S73.

In Step S73, the target phase angle VTT for the phase angle feedback control is set to the second target phase angle VTT2, which is a larger one (MAX=[(VTT2−C1), (VTSLN−CLMT)]) of a value calculated by subtracting the first predetermined value C1 from the current second target phase angle VTT2 and a value calculated by subtracting the predetermined limiting value CLMT (for example, 5 degree in crank angle) from the learned full closed position VTSLN of the limiting phase angle value for the stopper pressing determination.

In Step S74, which is a case where it is determined in Step S69 that the OCV linear solenoid current value ISC is less than the predetermined value ISR, the stopper pressing determination counter CNT2 is cleared (=0), and the procedure then goes to Step S63.

According to the valve timing controller for the internal combustion engine of the present invention, it is possible to achieve an effect that a state where the phase angle of the camshaft is pressed against the limiting phase angle position can be detected with a high degree of accuracy.

According to the valve timing controller for the internal combustion engine of the present invention, it is possible to achieve an effect that the cost is reduced since there is no need to provide an additional temperature sensor.

It is noted that though the embodiments, in which the OCV linear solenoid is employed as the actuator, of the present invention are described above, the same effects can be obtained in a configuration in which an electric motor is employed as the actuator.

Further, though the target phase angle set value for the limiting rotational phase angle value of the camshaft is set to the learned phase angle value. However, it goes without saying that, when the target phase angle set value for the limiting rotational phase angle value of the camshaft is set to the reference rotational phase angle value side of the camshaft by a predetermined value from the learned limiting phase angle value, the striking to the stopper is avoided and hence it is possible to achieve an effect of further improvement of durability.

What is claimed is:

1. A valve timing controller for an internal combustion engine, which drives with an actuator and changing a valve timing variable mechanism so that open and close timing of at least one of an intake valve and an exhaust valve is changed, the valve timing variable mechanism being capable of continuously changing a rotational phase angle of a camshaft with respect to a crankshaft of the internal combustion engine from a reference phase angle value at a time when phase angle control is stopped to a limiting phase angle value defined by a stopper, the valve timing controller for the internal combustion engine comprising:

a crank angle sensor for detecting a reference rotational position of the crankshaft;

a cam angle sensor for detecting a reference rotational position of the camshaft;

real phase angle detecting means for detecting a real phase angle of the camshaft based on detection signals from the crank angle sensor and the cam angle sensor;

driving condition detecting means for detecting a driving condition including a temperature parameter of the internal combustion engine;

first target phase angle setting means for setting a first target phase angle of the camshaft based on the driving condition detected by the driving condition detecting means;

phase angle feedback control means for performing feedback control so that the real phase angle is coincident with the first target phase angle and calculating an amount of operation for the actuator;

stopper pressing determination means for determining, based on a control parameter during the phase angle feedback control, whether or not the valve timing variable mechanism is pressed against a limiting position defined by the stopper;

second target phase angle setting means for setting a second target phase angle on a reference rotational phase angle value side of the camshaft by a first predetermined value from the detected real phase angle value of the camshaft when the stopper pressing determination means determines that the valve timing variable mechanism is pressed against the limiting position defined by the stopper; and target phase angle switching means for switching the target phase angle during the phase angle feedback control from the first target phase angle to the second target phase angle when the stopper pressing determination means determines that the valve timing variable mechanism is pressed against the limiting position defined by the stopper.

2. The valve timing controller for an internal combustion engine according to claim 1, wherein:

the detected rotational phase angle value of the camshaft, at the time when the stopper pressing determination means determines that the valve timing variable mechanism is pressed against the limiting position defined by the stopper, is learned as a learning value of the limiting rotational phase angle value of the camshaft; and the learning value is set to an upper limit of the first target phase angle, the upper limit being set by the first target phase angle setting means.

3. The valve timing controller for an internal combustion engine according to claim 1, wherein the stopper pressing determination means is configured to determine, based on a state of a control parameter during the phase angle feedback control, whether or not the valve timing variable mechanism is being pressed against the limiting position defined by the stopper when the detected rotational phase angle value of the camshaft is within a rotational phase angle region of the camshaft, the rotational phase angle region being set on a reference rotational phase angle value side of the camshaft by a second predetermined value from the leaning value of the limiting rotational phase angle value of the camshaft.

4. The valve timing controller for an internal combustion engine according to claim 1, wherein the stopper pressing determination means is configured to determine that the valve timing variable mechanism is being pressed against the limiting position defined by the stopper when a state where a difference obtained by subtracting the real phase angle from the first target phase angle during the phase angle feedback control exceeds 0 continues for a predetermined duration of time.

5. The valve timing controller for an internal combustion engine according to claim 1, wherein the stopper pressing determination means is configured to determine that the valve timing variable mechanism is being pressed against the limiting position defined by the stopper when a state where an amount of operation of the actuator during the phase angle feedback control exceeds a predetermined observation value of the amount of operation continues for a predetermined duration of time.

6. The valve timing controller for an internal combustion engine according to claim 5, wherein the amount of operation of the actuator, which is subjected to a filtering process, is used for the determination whether or not the valve timing variable mechanism is pressed against the limiting position defined by the stopper.

7. The valve timing controller for an internal combustion engine according to claim 5, wherein the observation value of the amount of operation is set based on information detected by the driving condition detecting means, the information including temperature and battery voltage.

8. The valve timing controller for an internal combustion engine of any one according to claim 1, wherein the second target phase angle setting means is configured to, during the phase angle feedback control based on the second target phase angle, update the second target phase angle on the reference rotational phase angle value of the camshaft by the first predetermined value from the second target phase angle, when a state where the amount of operation of the actuator, which is subjected to the filtering process exceeds the predetermined observation value of the amount of operation continues for a predetermined duration of time.

9. The valve timing controller for an internal combustion engine according to claim 8, wherein the second target phase angle value updated by the second target phase angle setting means is limited to a phase angle value set on the reference rotational phase angle value side of the camshaft by a predetermined value form the leaning value of the limiting rotational phase angle value of the camshaft.

10. The valve timing controller for an internal combustion engine according to claim 1, wherein during the feedback control of the real phase angle value to the second target phase angle value, the target phase angle switching means is configured to switch the target phase angle used for the phase angle feedback control from the second target phase angle to the first target phase angle, when the first target phase angle is set further on the reference rotational phase angle value side of the camshaft from the phase angle value set on the reference value side by a third predetermined value from said real phase angle value of the camshaft, the first target phase angle being set by the first target phase angle setting means based on the driving condition of the internal combustion engine.

11. The valve timing controller for an internal combustion engine according to claim 1, wherein the stopper pressing determination means, which determines the limiting rotational phase angle value of the camshaft based on the state of the control parameter during the phase angle feedback control to the first target phase angle, is configured to determine that the camshaft is pressed against the limiting position when a state where an estimated actuator current value, which is calculated based on an actuator driving circuit resistance value estimated based on said temperature parameter, a battery voltage, and the amount of operation of the actuator, exceeds a predetermined value continues for a predetermined duration of time.

12. The valve timing controller for an internal combustion engine according to claim 11, wherein:
the temperature parameter includes an oil temperature; and
the actuator driving circuit resistance value is calculated from the actuator resistance value estimated from the oil temperature, a harness resistance value, and an ON resistance value of an actuator driving element.

* * * * *